May 22, 1945.  LE BARON W. KINNEY, JR  2,376,491
TILTING CAB
Filed Feb. 1, 1943  3 Sheets-Sheet 1

INVENTOR.
LE BARON W. KINNEY, JR.
BY
ATTORNEYS

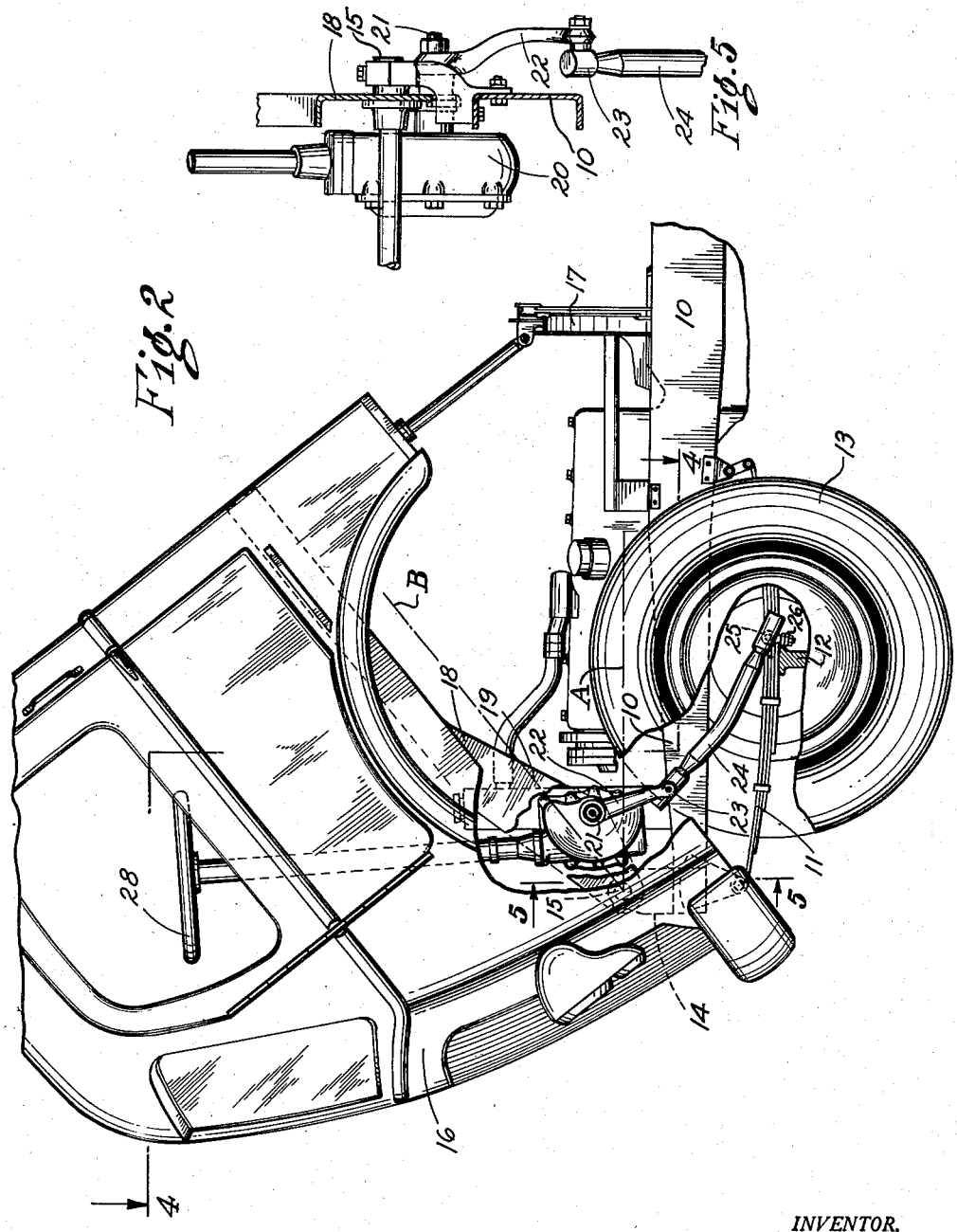

May 22, 1945.    LE BARON W. KINNEY, JR    2,376,491
TILTING CAB
Filed Feb. 1, 1943    3 Sheets-Sheet 3
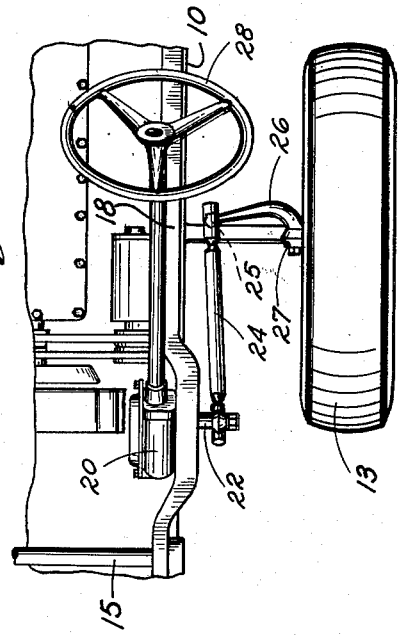
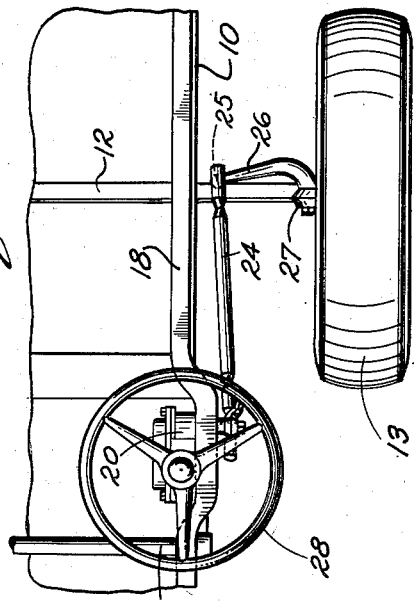
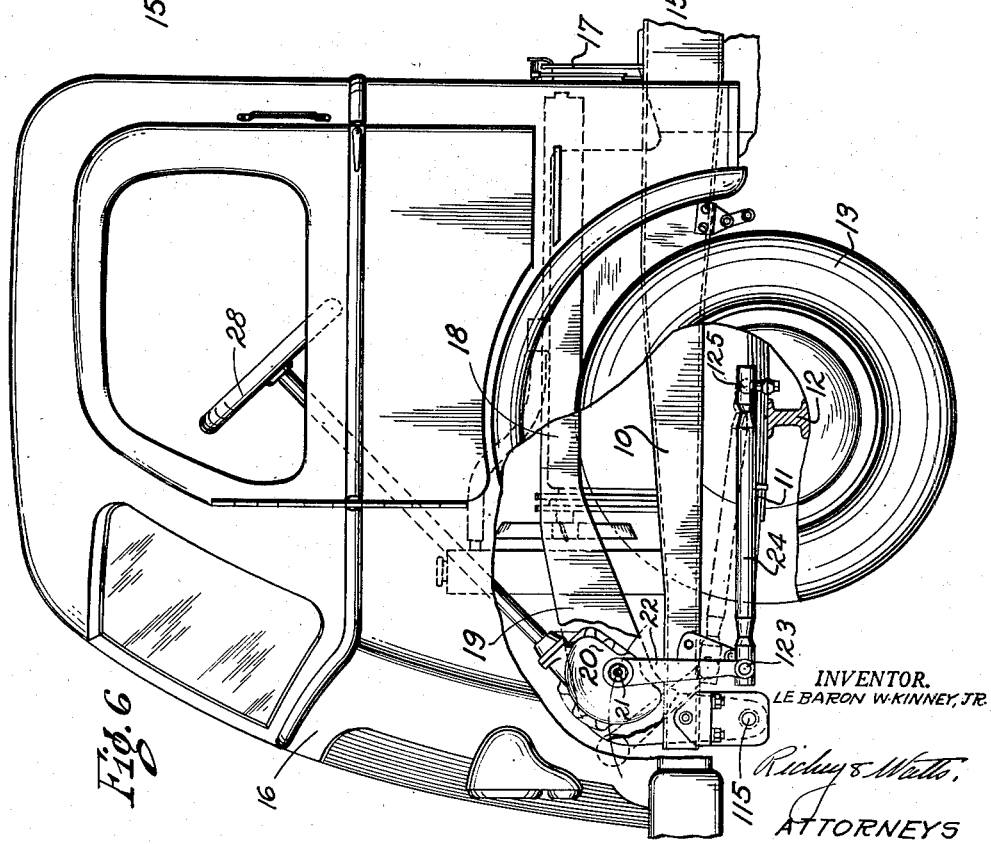
INVENTOR.
LE BARON W. KINNEY, JR.
ATTORNEYS Patented May 22, 1945

2,376,491

UNITED STATES PATENT OFFICE 2,376,491

TILTING CAB

Le Baron W. Kinney, Jr., Cleveland, Ohio, assignor to The White Motor Company, Cleveland, Ohio, a corporation of Ohio Application February 1, 1943, Serial No. 474,284

7 Claims. (Cl. 280—87)

This invention relates to motor vehicles of the tilting cab type and more specifically to improvements in steering gear connections therefor.

Heretofore in vehicles of this type it has been the practice to mount the steering gear assembly upon the vehicle frame and either provide a structure which would accommodate the tilting movement of the cab over the steering wheel or provide a detachable connection between the steering column and the reduction gear subassembly to facilitate the elevation of the steering column with the cab.

In service both of these constructions have been found objectionable. In the design in which the steering gear was affixed to the frame frequent replacement of the cowl bracket for bracing the upper portion of the column was found necessary due to fractures resulting from the independent movement between the frame and cab. Moreover, considerable time and effort were required in this construction to dismantle the bracket and remove the floor boards before the tilting operation could be performed. In the design embodying the detachable steering column appreciable time and effort were required to manipulate the latch interlocking the column with the gear unit, the time and effort for the preliminary adjustments, in either case, frequently discouraging the operator or service attendant from making minor but essential adjustments or repairs on the engine or motor accessories.

In the present invention the foregoing objections are eliminated by mounting the entire steering gear assembly, including the reduction gear unit, upon the cab and constructing the steering gear linkage so that the parts thereof may remain in interlinked relation during the tilting operation.

A further object of the invention resides in the provision of a design in which the position of the gear unit relative to the cab hinge and the length of the steering arms and drag link relative thereto are proportioned to maintain the parts in such angular relation with each other as to facilitate the free unrestricted movement thereof under operative conditions and throughout the tilting operation of the cab.

A still further object of the invention is to provide an organization of parts which will accommodate the use of a steering gear reduction unit and column of conventional form, a structure which will eliminate all pre-adjustments, or replacement of parts and a structure which is designed for maximum utility, dependability and economy.

Other objects and advantages more or less ancillary to the foregoing and the manner in which all the various objects are realized will appear in the following description, which considered in connection with the accompanying drawings, sets forth the preferred embodiment of the invention.

In the drawings:

Fig. 2 is a similar view of the vehicle illustrating the cab in its tilted position;

Fig. 3 is a horizontal sectional view of a portion of the vehicle illustrated in Fig. 1, the section being taken on a plane indicated by the line 3—3 of Fig. 1;

Fig. 4 is a similar sectional view illustrating the arrangement of parts when the cab is disposed in its elevated position, the section through the cab being taken on a plane indicated by the line 4—4 in Fig. 2;

Figure 1:
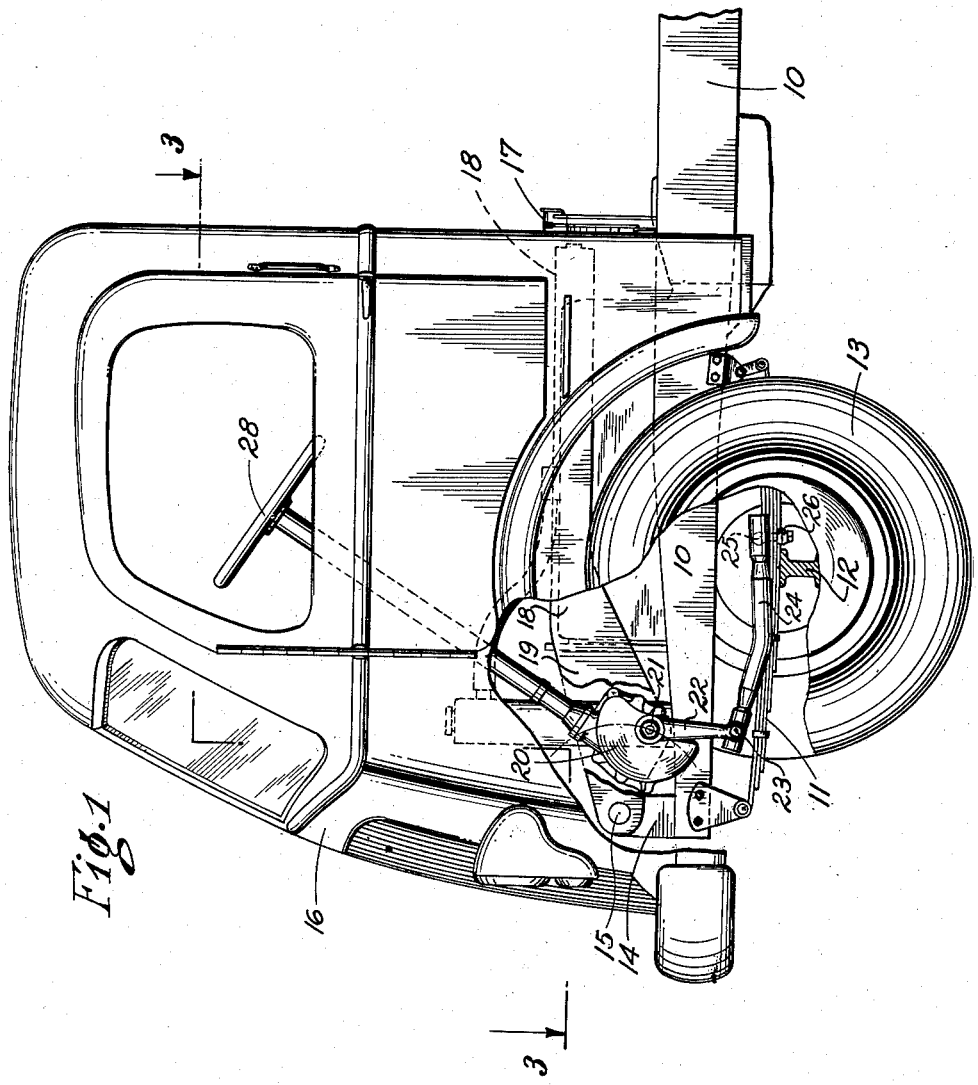
Fig. 1 is a side elevation of a fragmentary portion of a commercial vehicle embodying the improved steering gear connections, certain portions of the cab being broken away in the interest of clarity.

Fig. 5 is a vertical sectional view through the forward end of the chassis and cab frame, the section being taken on the line 5—5 in Fig. 2; and Fig. 6 is a side elevational view of a cab similar in structure to that illustrated in Fig. 1 but formed with the cab hinge below the chassis frame, the cab frame and steering linkage in this embodiment being modified to accommodate the alternate form of mounting.

Referring to Fig. 1, the vehicle chassis comprises a frame 10 of conventional form having road springs 11 mounted thereon for the support of a front axle 12 and road wheels 13. The frame 10 is provided with brackets 14 having trunnions 15 therein adapted for the support of the forward end of the cab 16. The cab is tipped forwardly about the trunnions 15 by a hydraulic ram 17 mounted upon a frame cross member adjacent the rear of the cab.

The cab sill structure or floor frame preferably comprises a pair of rails 18 formed with an enlarged section 19 adjacent the forward end thereof for the support of the steering worm or reduction gear unit 20.

As illustrated in Fig. 5, the housing for the reduction gearing 20 is rigidly mounted upon the inner face of the left sill or floor frame rail 18, the pitman arm shaft 21 being extended therethrough and provided with an arm 22 upon the free end thereof. The arm 22 is coupled through the medium of a swivel ball joint 23 with a drag link 24 connected in turn through a second swivel joint 25 to lever 26 formed in the steering knuckle 27 which is supported in the customary manner upon the front axle 12.

As the cab is tilted from the position illustrated in Fig. 1 to the position shown in Fig. 2, the pitman arm 22 is drawn rearwardly by the drag link 24, the frictional resistance of the vehicle tires with the ground being sufficient to cause the rotation of the worm gear or sector on the shaft 21 and the consequent idle motion of the steering wheel 28.

It will be noted that the arm 22 and the drag link 24 are of suitable length to prevent the alignment of the pivotal connections in the linkage and thus eliminate the hazard of a toggle action therein when the cab is tilted to its maximum elevation.

In the embodiment illustrated in Fig. 1, wherein the road wheels 13 are assumed parallel with the medial axis of the chassis, it will be seen that the gear unit 20 is mounted relatively close to the cab hinge 15, that the drag link is designed to accommodate the connection thereof with the pitman arm 22 when the arm is disposed normal to the horizontal plane of the chassis frame and that the arm is proportioned so that the swivel joint 23 in the end thereof is disposed below a plane passing through the axis of the cab hinge and the center of the ball joint 25. The geometric relation of parts is further designed so that the angle defined by the lines drawn through the points 23—15—25 is less than the tilting angle of the cab i. e. angle 23—15—25 is smaller than the angle A—15—B, (Fig. 2), hence when the cab is tilted to its maximum position the forward end of the drag link will come to rest at a point well below the plane passing through the points 21 and 25 which obviously avoids the imposition of tensional stress upon the linkage and swivel connections therefor.

As will be seen by comparison of Figs. 1 and 2, the arm 22 is moved slightly rearward under the influence of the drag link 24 during the tilting operation of the cab, this movement, however, and the consequent oscillation of the shaft 21 is well within the free movement of rotation available in the reduction gearing and has been found in practice to be free of any deleterious influence upon either the linkage or gearing.

In the embodiment illustrated in Fig. 6 the trunnions or cab hinge 115 is disposed subjacent the chassis frame 10, the drag link pivot 123 being arranged in the horizontal plane thereof and in proximity therewith. With this construction the cab fulcrum and the swivel joints 123 and 125 are in substantial alignment, hence as will be seen in the actuated position of the linkage illustrated in dotted lines, the drag link is never elevated to a height where the free operation of parts would be endangered.

The steering gear assembly contemplated herein may be of any of the conventional forms that embody a gear unit of the reversible type, moreover, the wheel and axle assembly may be of an orthodox design and any cab of the tilting type is susceptible of use with the present invention without structural modification thereof.

From the foregoing description it will be readily recognized that the cab tilting operation may be performed without manipulation or adjustment of the steering linkage, without pre-adjustment of the steering column and without removal of the floor boards and like obstructions replete in structures in which the steering column is stationary.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A motor vehicle comprising a chassis frame, front road wheels mounted thereon, steering levers associated with the front road wheels, a cab mounted for forward tilting movement on the forward end of said frame, a steering reduction gear unit mounted on said cab for tilting movement therewith, a steering column within said cab supported by said steering gear unit, a pitman arm shaft in said gear unit, a pitman arm depending from said shaft and a drag link pivotally connected to said pitman arm and one of said steering levers, the combined length of the pitman arm and drag link being greater than the center to center distance between said pitman arm shaft and the steering connection with said drag link whereby an operative connection is maintained between the pitman arm and drag link when the cab is tilted to its maximum position of adjustment.

2. A motor vehicle comprising a frame, front road wheels supported thereon, a steering lever associated with one of the front road wheels, a cab surmounted on said frame, a cab pivot on the forward end of said frame to facilitate the tilting movement of the cab, a steering gear assembly mounted on said cab, a steering arm depending therefrom, a drag link pivotally connected with said steering arm and said steering lever, said steering gear assembly being disposed in intimate relation with said cab pivot, whereby the maximum angle elevation of the cab exceeds the maximum angle of elevation of the forward end of the drag link during the tilting operation of the cab.

3. A motor vehicle embodying a frame, front road wheels mounted thereon, a steering lever for movement of said wheels, a cab mounted on said frame, trunnions on the forward end of the frame to facilitate the tilting movement of the cab, a steering gear mounted on said cab adjacent said trunnions, a drag link operatively connected with said steering gear and said steering lever and swivel connections on said drag link adapted to accommodate the tilting movement of said cab.

4. A motor vehicle embodying a frame, front road wheels thereon, a steering lever on one of the front road wheels, a cab mounted on said frame, trunnions thereon to facilitate the forward tilting movement thereof, a steering reduction gear unit on said cab, a pitman arm depending from said gear unit, a drag link intermediate said pitman lever and steering lever, ball joints connecting said drag link with said pitman arm and said steering lever, the ball joint connecting said pitman arm with said drag link being disposed to facilitate the interconnected relation of the parts and the free, unrestricted movement thereof throughout the tilting movement of the cab.

5. In a motor vehicle including road wheels having a steering lever thereon, a chassis frame, a cab and a fulcrum on the forward end of the frame for the support of the cab, mechanism for steering said wheels comprising a reduction gear unit mounted on said cab, a steering arm thereon, a steering column on said gear unit within said cab and a drag link pivotally connected with said steering arm, said drag link being proportioned relative to the fulcrum for the cab to accommodate the elevation of the forward end of the drag link when coupled with the steering arm during the tilting movement of the cab irrespective the position of the wheels.

6. In a motor vehicle including a frame, road wheels, steering levers thereon, a cab and trunnions on said frame for the forward tilting movement of said cab, mechanism for steering said wheels comprising a steering gear assembly mounted on the cab to move therewith, a pair of reduction gears in said steering gear assembly, a steering arm associated with one of said reduction gears, a drag link pivotally connected with said arm and one of said steering levers, the length of said drag link being proportioned relative to the distance of said arm from said trunnions to delimit the movement of the arm to the free movement of oscillation of one of said reduction gears relative to the other.

7. In a motor vehicle embodying a frame and front road wheels, a cab mounted for forward tilting movement on said frame, a steering gear assembly mounted on said cab, steering levers associated with said wheels, and linkage intermediate said steering gear and said steering levers, the length of the respective parts of said linkage being proportioned relative to each other, the steering gear, and steering levers, to accommodate free movement of the linkage while interconnected during the tilting movement of the cab.

LE BARON W. KINNEY, Jr.